UNITED STATES PATENT OFFICE.

CARL RUMPFF, OF APRATH, NEAR ELBERFELD, PRUSSIA, GERMANY.

MANUFACTURE OF COLORING-MATTER FROM NAPHTHYLAMINE.

SPECIFICATION forming part of Letters Patent No. 261,175, dated July 18, 1882.

Application filed April 21, 1882. (Specimens.)

*To all whom it may concern:*

Be it known that I, CARL RUMPFF, residing at Aprath, near Elberfeld, in the Kingdom of Prussia and Empire of Germany, have invented a new and useful Improvement in Manufacturing a new Brown Dye-Stuff, of which the following is a specification.

This invention relates to a brown dye-stuff or coloring-matter which is produced by the action of diazo-naphtalene sulphonate of soda upon naphthylamine in an acid solution.

In carrying out my invention I take fifty pounds of naphthylamine sulphonate of soda dissolved in five hundred pounds of water, and cooled down with ice to 3° centigrade. To this solution I add slowly seventy-five pounds of muriatic acid, and thereafter eleven pounds sodium nitrate dissolved in forty pounds of water. After several hours' rest the liquid is poured into a solution containing twenty-five pounds of naphthylamine, fifty pounds of muriatic acid, and five hundred pounds of water. The new brown dye-stuff separates instantly as a voluminous precipitate, which is filtered and dried.

My dye-stuff, when dry, appears as a brown powder. It is soluble in hot water, and crystallizes when the solution gets cold. The aqueous solution becomes yellowish brown by addition of alkalies. It becomes, however, bluish red by the addition of concentrated mineral acids, and the dye-stuff separates partially. The new dye-stuff dyes silk and wool in an acidulated bath, and is fast against soap and light.

What I claim as new, and desire to secure by Letters Patent, is—

The new brown dye-stuff or coloring-matter which is produced by the action of diazo-naphtalene sulphonate of soda upon naphthylamine in an acid solution.

CARL RUMPFF.

Witnesses:
  J. FERD. KEDENBURG,
  A. SCHEELE.